United States Patent [19]

Bahl

[11] 4,242,687
[45] Dec. 30, 1980

[54] HEATED DEFLECTION ELECTRODE ASSEMBLY FOR A JET DROP RECORDER

[75] Inventor: Surinder K. Bahl, Dayton, Ohio

[73] Assignee: The Mead Corporation, Dayton, Ohio

[21] Appl. No.: 55,412

[22] Filed: Jul. 6, 1979

[51] Int. Cl.³ .......................................... G01D 15/16
[52] U.S. Cl. .................................. 346/75; 346/140 R
[58] Field of Search .................................. 346/75, 140

[56] References Cited

U.S. PATENT DOCUMENTS

| 3,701,998 | 10/1972 | Mathis | 346/75 |
| 3,739,393 | 6/1973 | Lyon | 346/75 X |
| 3,777,307 | 12/1973 | Duffield | 346/75 |
| 3,787,883 | 1/1974 | Cassill | 346/75 |
| 3,813,675 | 5/1974 | Steffy | 346/75 |
| 3,955,203 | 5/1976 | Chocholaty | 346/75 |
| 4,023,183 | 5/1977 | Takano | 346/75 |
| 4,031,563 | 6/1977 | Paranjpe | 346/75 |
| 4,050,377 | 9/1977 | Watanabe | 346/75 X |
| 4,184,167 | 1/1980 | Vandervalk | 346/75 |

Primary Examiner—Joseph W. Hartary
Attorney, Agent, or Firm—Biebel, French & Nauman

[57] ABSTRACT

An improved deflection electrode assembly for a jet drop recording apparatus is heated to prevent condensation of ink mist thereon and its attendant buildup on the electrode. Heating wires are stretched above and below a thin, ribbon shaped deflection electrode and run parallel to it along its length. Thin sheets of thermally conductive but electrically nonconductive material such as mica sandwich the electrode and heating wires and serve to transfer heat from the wires to the surface of the electrode assembly. Only a slight increase in the surface temperature of the electrode assembly is necessary to prevent condensation of ink mist thereon.

9 Claims, 5 Drawing Figures

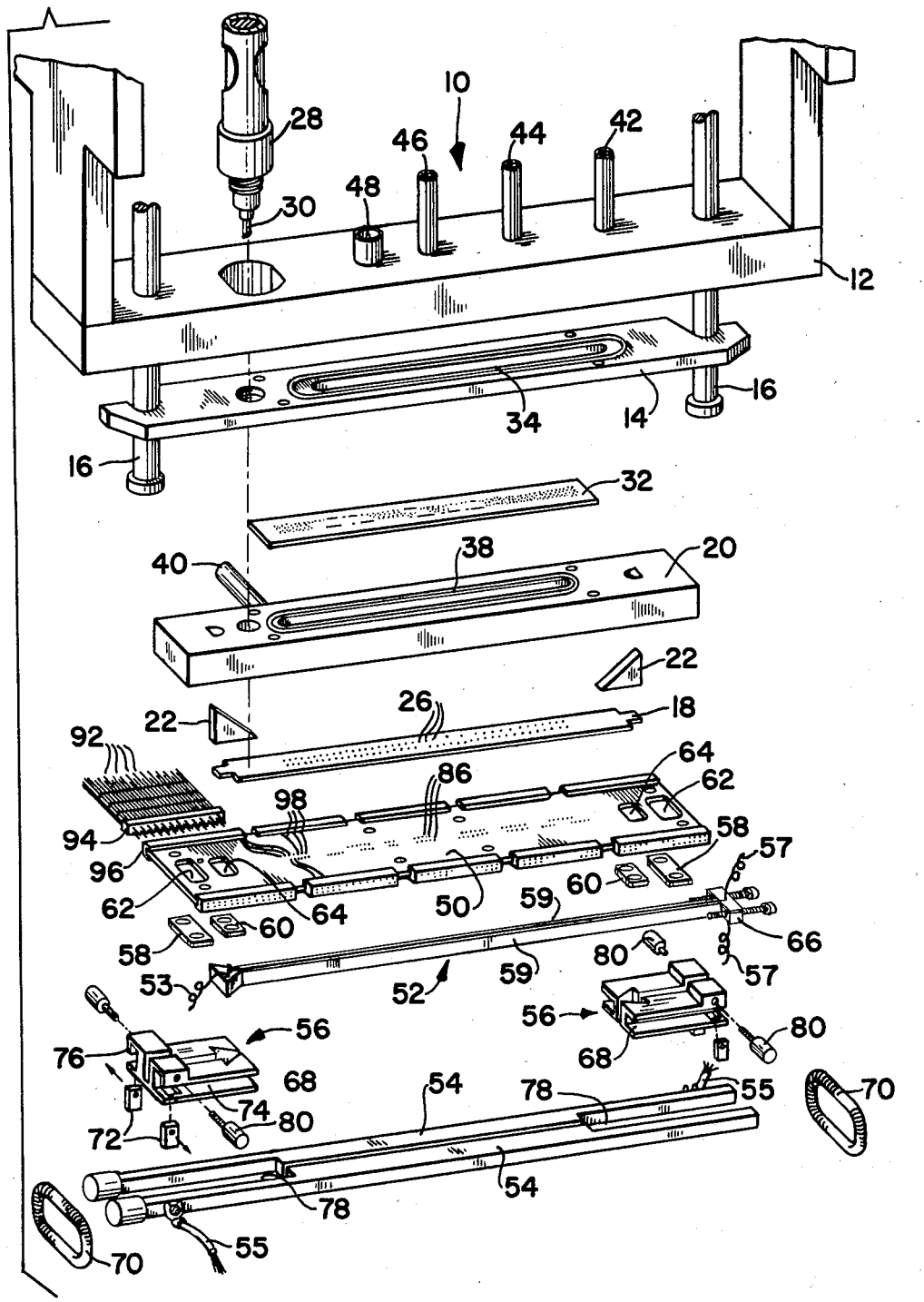

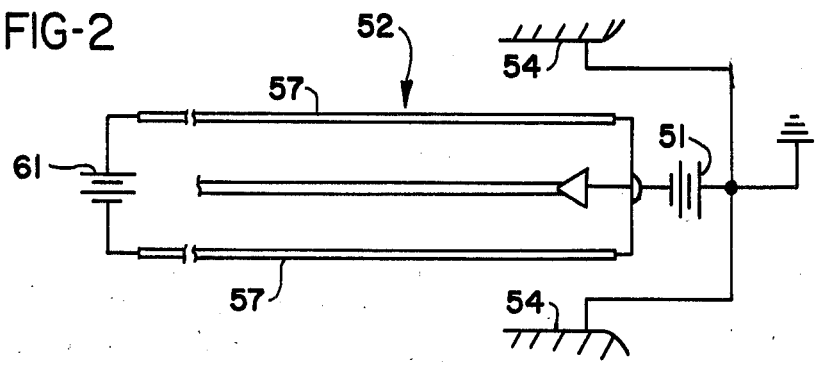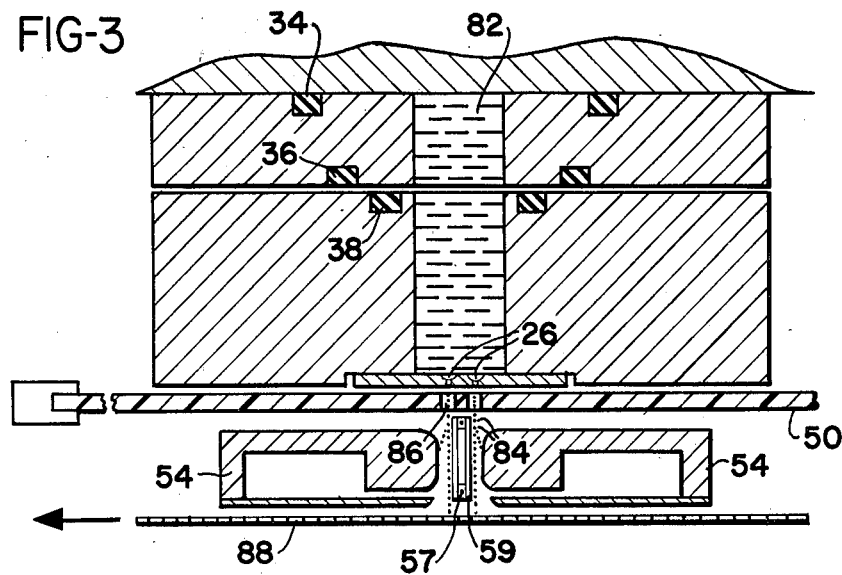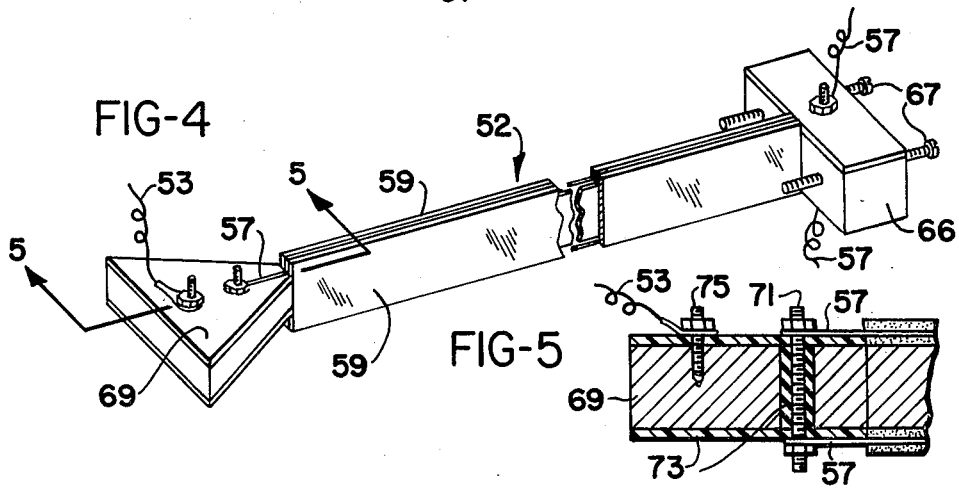

HEATED DEFLECTION ELECTRODE ASSEMBLY FOR A JET DROP RECORDER

BACKGROUND OF THE INVENTION

This invention relates generally to the field of fluid drop generation and the application thereof to jet drop recorders of the type shown in Mathis, U.S. Pat. No. 3,701,998. In recorders of this type, there are a pair of rows of orifices in a plate which receive an electrically conducting recording fluid, such as for example a water base ink, from a pressurized manifold and eject the fluid, in the form of drops, in two rows of parallel streams. The fluid flows through these orifices and is formed into drops by the application of a series of traversing waves to the orifice-containing plate. This method of drop generation is more completely described in Lyons et al, U.S. Pat. No. 3,739,393, to which reference is made.

Graphic reproduction in recorders of this type is accomplished by selectively charging and deflecting some of the drops in each of the streams and thereafter disposing the uncharged drops on a moving web of paper or other material. Charging of the drops is accomplished by application of binary charge control singals to charging electrodes positioned near the tips of the fluid filaments immediately prior to drop formation. This induces an opposite charge upon the conductive fluid filaments, and a portion of this charge is carried away by the drops. Thereafter, the drops pass through electrostatic fields which have no effect upon the uncharged drops but which cause the charged drops to be deflected for catching by one or the other of a pair of catchers which service the rows of streams.

Cassill, U.S. Pat. No. 3,787,883, discloses apparatus for creating the deflecting electrostatic fields. A thin deflection ribbon is positioned between and parallel to the two rows of parallel drop streams with the catchers positioned outwardly of the drop streams. A voltage is applied between the deflection ribbon and the catchers such that charged ink drops will be deflected to one of the two catchers.

The apparatus generating the fluid drops may also generate droplets of small size which form an ink mist. While very little of this mist will be present at any one time, ink buildup on various surfaces of the printer, including the deflection electrodes, may result over a period of operation. An unwanted ink mist in the printer may also result from crooked ink jets or from difficulties encountered in starting up or shutting down the printer.

Heretofore, ink mist buildup on a deflection electrode has been remedied by mechanical clean-up of the electrode after ink has been deposited thereon. This was accomplished by periodically shutting down the printing operation and removing and cleaning the affected parts. However, such periodic cleaning was both inconvenient and expensive but necessary to avoid a deleterious ink buildup which would eventually affect printing quality. In response to the problem, various methods of continuously cleaning the deflection electrodes during operation were developed. Takano et al, U.S. Pat. No. 4,023,183, utilizes rotating cylindrically shaped deflection electrodes having cleaning pads located away from the electrical field through which the conductive ink drops pass. As the electrodes rotate, the pads continuously wipe away any ink which has been deposited thereon. Paranjpe, U.S. Pat. No. 4,031,563, and Chocholaty, U.S. Pat. No. 3,955,203, utilize a porous deflection ribbon connected to a vacuum source. Any ink deposited on the deflection ribbon is ingested into the ribbon and carried away by the vacuum. Another known technique is to provide grooves in deflection electrodes. Ink droplets deposited on the electrodes are drawn into the grooves and transported away from the electrode surface by virtue of the capillary action of the grooves as taught by Steffy, U.S. Pat. No. 3,813,675. Finally, Watanabe et al, U.S. Pat. No. 4,050,377, teach use of a heated element inside the aperture board of an ink mist printer to lower the relative humidity inside the board and prevent condensation.

Although all of the above methods function to a greater or lesser extent to remove ink once it has been deposited on a deflection electrode, it is highly desirable that ink be prevented from depositing on the electrode in the first place. If there is no ink deposition, there is no need to resort to the complication and expense of integrating a clean-up capability into the ink jet printer. Additionally, many of the prior art solutions to the ink mist deposition problem have resulted in a deflection electrode structure having a considerably increased cross-section. Because of the limited space available in a jet printer, particularly in the area occupied by the deflection electrode and catchers, it is highly desirable to maintain as thin a deflection electrode as possible.

SUMMARY OF THE INVENTION

A very thin, electrically conductive deflection electrode is provided with heating means which increases the surface temperature of the electrode sufficiently to prevent deposition of ink mist thereon. Two heating wires are positioned along the length of the electrode, one above and one below the electrode and not in electrical contact with it. Two thin sheets of mica or other thermally conductive material are then used to sandwich either side of the heating wires and deflection electrode. When current is applied to the heating wires, the heat generated is transferred to the mica sheets and prevents condensation of any ink drops or mist on the electrode structure. An increased temperature only slightly above the ambient temperature in the jet recorder is sufficient to prevent condensation.

Preferably, the deflection electrode and heating wires are stretched between a pair of catcher holders with one end of this assembly being grasped by one of the catcher holders and the other end of the assembly being grasped by a tightening block having a pair of screws passing therethrough. The screws extend in a direction parallel to the deflection electrode for contact with a face of a second catcher holder. The deflection electrode and heating wires may be positioned between the catcher holders in a slack condition and then drawn into a taut condition by adjustment of the tightening screws. In this position, this assembly can then be sandwiched between a pair of thermally conductive mica sheets.

BRIEF DESCRIPTION OF THE DRAWINGS

FIG. 1 is an exploded perspective view of a recording head assembly;

FIG. 2 is a diagrammatic representation of the two separate electrical circuits, one for the deflection electrode and catchers, and the second for heating the deflection electrode assembly;

FIG. 3 is a sectional view through the assembly of FIG. 1;

FIG. 4 is an enlarged perspective view of the heated deflection electrode assembly; and FIG. 5 is an enlarged sectional view of a portion of one end of the deflection electrode assembly taken along line 5—5 in FIG. 4.

DESCRIPTION OF THE PREFERRED EMBODIMENTS

With reference to FIG. 1 of the drawings, the various elements of a head assembly 10 are assembled for support by a support bar 12. Assembly thereto is accomplished by attaching the elements by means of machine screws (not shown) to a clamp bar 14 which is in turn connected to the support bar 12 by means of clamp rods 16.

A means for generating two parallel rows of drop streams comprises an orifice plate 18 soldered, welded, or otherwise bonded to fluid supply manifold 20 with a pair of wedge-shaped acoustical dampers 22 therebetween. Orifice plate 18 is preferably formed of a relatively stiff material such as stainless steel or nickel coated beryllium-copper, but is relatively thin to provide the required flexibility for direct contact stimulation.

Orifice plate 18 contains two rows of orifices 26 for forming the two parallel rows of drop streams. One of the methods for stimulating this plate includes the use of stimulator 28 which is threaded into clamp bar 14 to carry a stimulation probe 30 through the manifold 20 and into direct contact with plate 18. Orifice plate 18, manifold 20, clamp bar 14 together with a filter plate 32 and O rings 34 and 38 comprise a clean package which may be preassembled and kept closed to prevent dirt or foreign material from reaching and clogging orifices 26. Conduit 40 may be provided for flushing of the clean package. Service connections for the recording head includes a fluid supply tube 42, air exhaust and inlet tubes 44 and 46, and a tube 48 for connection to a pressure transducer (not shown).

Means for selective charging of the drops comprises a charge ring plate 50. A deflection electrode assembly 52 is positioned to extend between the two rows of drop streams in parallel relation thereto. Heating wires 57 are stretched above and below deflection electrode assembly 52 and both are sandwiched by thermally conductive sheets 59. The heating wires are maintained electrically insulated from the deflection electrode. A pair of opposed catchers 54 are disposed outwardly of the rows of drop streams and are supported by holders 56 which are fastened directly to fluid supply manifold 20. Wires 55 comprise a means for grounding the catchers 54 and causing them to function as deflection electrodes.

Spacers 58 and 60 reach through apertures 62 and 64, respectively, in charge ring plate 50. These spacers support holders 56 without stressing or constraining charge ring plate 50. Deflection electrode assembly 52 is also supported by holders 56 and is stretched tightly therebetween by means of tightening block 66. Electrode assembly 52 extends longitudinally between catchers 54 as best shown in FIG. 3.

Catchers 54 are laterally adjustable relative to electrode assembly 52. This adjustability is accomplished by assembling the head with catchers 54 resting in slots 68 of holders 56, and urging them mutually inward with a pair of elastic bands 70. Adjusting blocks 72 are inserted upwardly through recesses 74 and 76 to bear against faces 78 of catchers 54, and adjusting screws 80 are provided to drive adjusting blocks 72 and catchers 54 outwardly against elastic bands 70. Holders 56 are made of insulative material which may be any available reinforced plastic board.

As shown schematically in FIG. 2, means for applying a drop deflecting voltage to deflection electrode assembly 52 may comprise a battery 51 or any other source of electrical potential. A pair of equal strength, oppositely directed electrical deflection fields are induced between electrode assembly 52 and catchers 54. If a voltage of like polarity to the charge applied to the charged drops is applied to deflection electrode assembly 52, the charged dropped will be deflected outwardly from the ribbon toward catchers 54.

Also shown in FIG. 2, is a separate circuit connecting heating wires 57 to a second source of electrical current such as battery 61. As will be described more fully below, when current is passed through wires 57, they are resistively heated. The heat thus generated is transferred to thermally conductive sheets (not shown in FIG. 2) whose surface temperature is raised. Any ink mist produced in the area of electrode assembly 52 will not condense thereon. Preferably, a direct current source is utilized for the heating circuit since use of an alternating current source may generate a magnetic field which could affect drop trajectory.

The fully assembled recording head is shown in cross-section in FIG. 3. As illustrated therein, ink fluid 82 flows downwardly through orifices 26 forming two rows of streams which break up into two curtains of drops 84. Drops 84 then pass through two rows of charge rings 86 in charge plate 50 and thence onto one of the catchers 54, or onto a moving web of paper 88. Switching of drops between catch and deposit trajectories is accomplished by electrostatic charging and deflection. Coordinated printing capabilities are achieved in accordance with the teachings of Taylor et al, U.S. Pat. No. Re. 28,219.

Formation of drops 84 is closely controlled by application of a constant frequency, controlled amplitude, stimulating disturbance to each of the fluid streams emanating from orifice plate 18. Disturbances for this purpose may be set up by operating transducer 28 to vibrate probe 30 at constant amplitude and frequency against plate 18. This causes a continuing series of bending waves to travel the length of plate 18 with each wave producing a drop stimulating disturbance each time it passes one of the orifices 26. Dampers 22 prevent reflection and repropagation of these waves. Accordingly, each stream comprises an unbroken fluid filament and a series of uniformly sized and regularly spaced drops, all in accordance with the well-known Rayleigh jet break-up phenomenon.

As each drop 84 is formed, it is exposed to the charging influence of one of the charge rings 86. If the drop is to be deflected and caught, an electrical charge is applied to the associated charge ring 86 during the instant at which the drop is formed. This causes an electrical charge to be induced in the tip of the fluid filament and carried away by the drop. As the drop traverses the deflecting field set up between electrode assembly 52 and the face of adjacent catcher 54, it is deflected to strike and run down the face of the catcher where it is ingested and carried off. Drop ingestion may be promoted by application of a suitable vacuum to the central ingestion chambers of catchers 54. When drops are to be deposited on web 88, no electrical charge is applied to the associated charge rings.

Appropriate charges are applied to desired drops by setting up an electrical potential difference between orifice plate 18 (or any other conductive structure in electrical contact with the ink fluid supply) and each appropriate charge ring 86. As shown in FIG. 1, these potential differences are created by grounding plate 18 and applying appropriately timed voltage pulses to wires 92 in connectors 94 (only one of which is illustrated). Connectors 94 are plugged into receptacles 96 at the edge of charge ring plate 50 and deliver appropriate voltage pulses over printed circuit lines 98 to charge rings 86.

Charge ring plate 50 is fabricated from insulative material and charge rings 86 are formed by coating the surfaces of orifices in the charge ring plate with a conductive material. Voltage pulses for the above purpose may be generated by circuits of the type disclosed in Taylor et al, cited above, and wires 92 receiving these pulses may be matched with charge rings 86 on a one-to-one basis. Alternatively, the voltage pulses may be multiplexed to decrease the number of wires and connectors. For such an embodiment, solid state demultiplexing circuits may be employed to demultiplex the signals and route the pulses to the proper charge rings. Such solid state circuits may be manufactured by known methods as a permanent part of charge ring plate 50.

Referring now to FIG. 4, there is shown in perspective a partially cut-away view of one embodiment of the heated deflection electrode. Electrode assembly 52 is a thin ribbon of a strong and electrically conductive material such as stainless steel and/or platinum. The ribbon may also be formed from an amorphous nickel-containing metal alloy such as that sold under the trademark METGLAS by Allied Chemical Corp., Morristown, N.J. It will be appreciated that electrode assembly 52 must be very thin and straight for proper operation in a compactly arranged head. Thus, in the preferred construction of the electrode, the thin ribbon is fabricated from stainless steel about 0.01 inches (10 mils) thick. If an amorphous metal alloy such as METGLAS is used, only a 0.002 inch (2 mil) thick ribbon need be used. Heating wires 57, preferably of an iron-nickel-chromium alloy such as nichrome wire, are placed above and below electrode assembly 52 and run parallel to it along its length. The deflection electrode and heating wires are positioned by wrapping electrode assembly 52 around an enlarged triangular-shaped head 69 at one end and stretching the assembly between catcher holders 56 as described above. The triangular-shaped head 69 is grasped by the left hand holder, as can be seen in FIG. 1, and the other end of electrode assembly 52 is grasped by tightening block 66. A lead wire 53 connected to a source of electrical potential (not shown), is attached to head 69 as illustrated.

The operation of tightening block 66 is best illustrated in FIG. 4. Screws 67 extend through the tightening block to bear against a face of catcher holder 56. The deflection electrode with accompanying heating wires 57 extends through a slot in tightening block 66. Screws 67 may be initially adjusted so that there is sufficient slack for ease of head assembly. Later, after catcher holders 56 are mounted in place with deflection electrode assembly 52 extending therebetween, screws 67 may be tightened to draw the electrode assembly longitudinally and stretch it to a taut condition.

Heat produced by resistively heating wires 57 is transferred to the surface of electrode assembly 52 containing thermally conductive sheets 59. Such sheets are made of an electrically nonconductive material having good thermal conductivity properties such as mica or aluminum oxide and have a thickness of 2–3 mils each. Sheets 59 are sized such that their edges extend beyond heating wires 57 and extend at least along that portion of electrode along which drops 84 traverse, and preferably along the entire length of electrode 52. Sheets 59 are secured to electrode assembly 52 and to each other by use of a suitable adhesive, preferably one which will withstand elevated temperatures. A suitable adhesive for this purpose is an epoxy ceramic cement sold under the name Epotherm and is available from Transene Co., Rowley, Mass. The finished heated electrode assembly will have an overall thickness of only about 14–16 mils and is positioned between the catchers as described.

As illustrated in FIG. 5, heating wires 57 are attached to electrically conductive post 71 to provide a completed electrical circuit. Triangular-shaped head 69 is coated with suitable electrical insulating material 73 to maintain electrical separation of the heating circuit from the deflection electrode potential circuit. Triangular-shaped head 69 is itself made of electrically conductive material and links deflection electrode assembly 52 with lead wire 53 through conductive post 75.

In operation, the surfaces of deflection electrode assembly 52 and sheets 59 are heated by thermal transfer from heating wires 57. Only a slight rise in the temperature of the electrode assembly is needed to prevent condensation of any ink mist present in the area between the electrode assembly and catchers 54. This is because the vapor pressure of whatever liquid base is used in the ink, for example water for aqueous based inks, varies exponentially with temperature according to the Clausius-Clapeyron equation. Thus, the vapor pressure of water increases exponentially with increasing temperature. For example, if during operation the atmosphere in the region near the deflection electrode became saturated (i.e., reached 100 percent relative humidity) with ink mist at an ambient temperature of 70° F., mist would begin to condense on the deflection electrode assembly. However, if the surface temperature of the electrode assembly is raised just 10° F. to 80° F., the relative humidity in that region decreases to about 70 percent, and no mist will condense on the assembly. In this manner, the electrode assembly is kept free of any deleterious effects of ink buildup.

While the form of apparatus herein described constitutes a preferred embodiment of the invention, it is to be understood that the invention is not limited to this precise form of apparatus, and that changes may be made therein without departing from the scope of the invention.

What is claimed is:

1. A deflection electrode assembly for use in a jet drop recording head having means for generating a plurality of drop streams in two parallel rows, each stream consisting of a series of liquid recording drops, means for selectively charging said drops, a pair of opposed catchers for catching the drops, and a source of drop deflecting potential comprising:
   a substantially electrically conductive deflection electrode means,
   support means for supporting said deflection electrode means in a position parallel to said rows of drops and extending therebetween along a line midway between said catchers, means for connecting said electrode means to said source of drop deflecting potential, and means for heating said deflection electrode means to a temperature greater than the ambient temperature in said jet drop recording head, said heating means comprising, a pair of substantially electrically conductive wires which generate heat when electric current is passed thereto, running parallel to and spaced apart from the upper and lower edges of said deflection electrode, said wires electrically insulated from said deflection electrode, and two sheets of thermally conductive but electrically nonconductive material which sandwich said wires and said deflection electrode.

2. The deflection electrode assembly of claim 1 in which said deflection electrode means comprises a stainless steel strip about 0.01 inch thick.

3. The deflection electrode assembly of claim 2 in which said thermally conductive but electrically nonconductive material is selected from the group consisting of mica and aluminum oxide.

4. The deflection electrode assembly of claim 1 in which said deflection electrode means comprises a amorphous metal alloy ribbon about 0.002 inches thick.

5. The deflection electrode assembly of claims 3 or 4 in which said wires are nichrome wires.

6. An ink jet printer for depositing a plurality of ink drops upon a moving print receiving medium to form an image thereon comprising:

print head means for generating a plurality of jet drop streams directed at said moving print receiving medium, said streams being arranged in parallel rows, drop charging means adjacent each of said jet drop streams for selectively charging drops in said drop streams, a pair of drop ingesting catchers extending parallel to said pair of parallel rows of jet drop streams and spaced outwardly therefrom for catching drops deflected into catch trajectories and prevent such drops from reaching the print receiving medium, a substantially electrically conductive deflection electrode means extending parallel to said rows of drops and extending therebetween along a line midway between said catchers, means for applying a deflection potential to said deflection electrode means to deflect appropriately charged drops into said drop ingesting catchers, and means for heating said deflection electrode means to a temperature greater than the ambient temperature in said ink jet printer, said heating means comprising a pair of substantially electrically conductive wires which generate heat when electric current is applied thereto, running parallel to and spaced apart from the upper and lower edges of said deflection electrode means, said wires electrically insulated from said deflection electrode means, and two sheets of thermally conductive but electrically nonconductive material which sandwiches said wires and said deflection electrode means.

7. The ink jet printer of claim 6 in which said deflection electrode means comprises a stainless steel strip about 0.01 inch thick.

8. The ink jet printer of claim 7 in which said thermally conductive but electrically non-conductive material is selected from the group consisting of mica and aluminum oxide.

9. The ink jet printer of claim 8 in which said wires are nichrome wires.

* * * * *